(12) United States Patent  
Hickman

(10) Patent No.: US 8,226,026 B2
(45) Date of Patent: Jul. 24, 2012

(54) HUMAN INTERFACE ROTOR SYSTEM HELICOPTER (HIR)

(76) Inventor: David Allen Hickman, Abingdon, IL (US)

( * ) Notice: Subject to any disclaimer, the term of this patent is extended or adjusted under 35 U.S.C. 154(b) by 510 days.

(21) Appl. No.: 12/462,595

(22) Filed: Aug. 6, 2009

(65) Prior Publication Data

US 2011/0031345 A1 Feb. 10, 2011

(51) Int. Cl.
  *B64C 27/06* (2006.01)
(52) U.S. Cl. .................. 244/17.25; 244/17.11
(58) Field of Classification Search ............. 244/17.19, 244/17.21, 17.25, 17.27, 56
  See application file for complete search history.

(56) References Cited

U.S. PATENT DOCUMENTS

| | | | | |
|---|---|---|---|---|
| 3,118,504 A | * | 1/1964 | Cresap | 416/1 |
| 3,586,263 A | * | 6/1971 | Payne | 244/17.17 |
| 3,765,622 A | * | 10/1973 | Haines | 244/17.11 |
| 3,921,939 A | * | 11/1975 | Garfinkle | 244/17.25 |
| 4,071,206 A | * | 1/1978 | Magill | 244/17.11 |
| 4,720,059 A | * | 1/1988 | Stearns, Jr. | 244/17.11 |
| 5,370,341 A | * | 12/1994 | Leon | 244/17.11 |
| 5,740,987 A | * | 4/1998 | Morris et al. | 244/17.25 |
| 6,293,492 B1 | * | 9/2001 | Yanagisawa | 244/17.25 |
| 7,168,656 B2 | * | 1/2007 | Pai | 244/17.23 |
| 7,448,571 B1 | * | 11/2008 | Carter et al. | 244/17.25 |

* cited by examiner

*Primary Examiner* — Michael Carone
*Assistant Examiner* — Nicholas McFall

(57) ABSTRACT

A single place helicopter comprising a lower airframe and an upper airframe, having a rotor shaft attached thereto, rotor blades, and a hub on said rotor shaft with means to change blade pitch for vertical flight. The upper airframe comprising a rotor system, engine, tail boom and tail rotor tilt as one unit with the pilot forward, rearward and in a lateral attitude for directional flight control by means of a hinged gimbal joint or block fastened between the two airframes. By allowing the pilot to move with the rotor system this configuration combines physical human interface and mechanical airframe manipulation to change the plane of rotation controlling the thrust vector and flight direction of the aircraft.

1 Claim, 5 Drawing Sheets

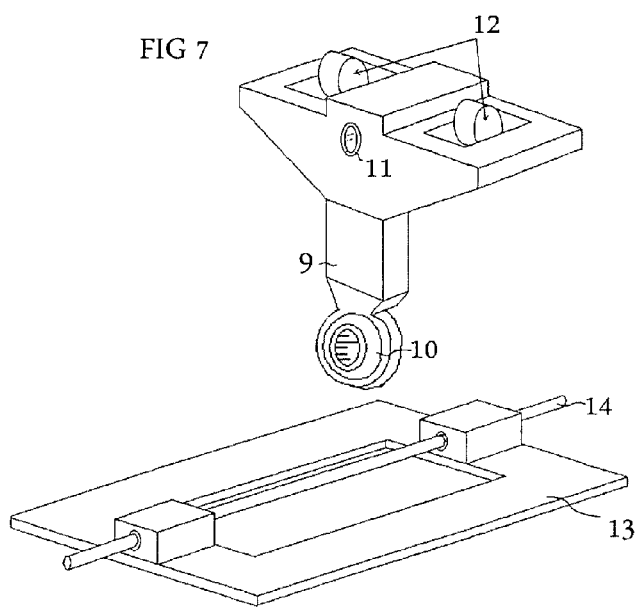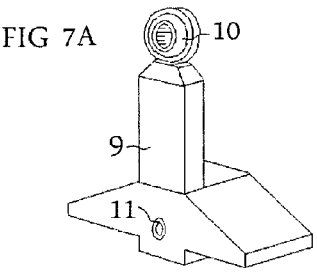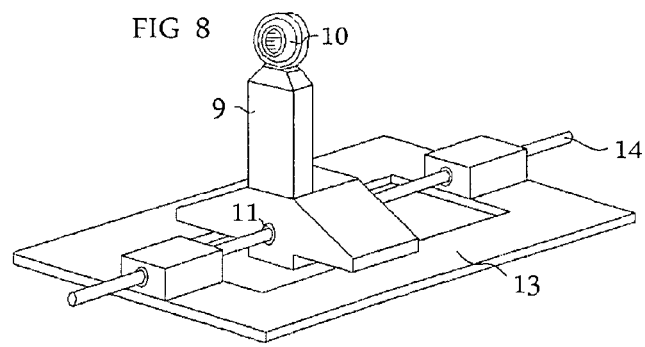

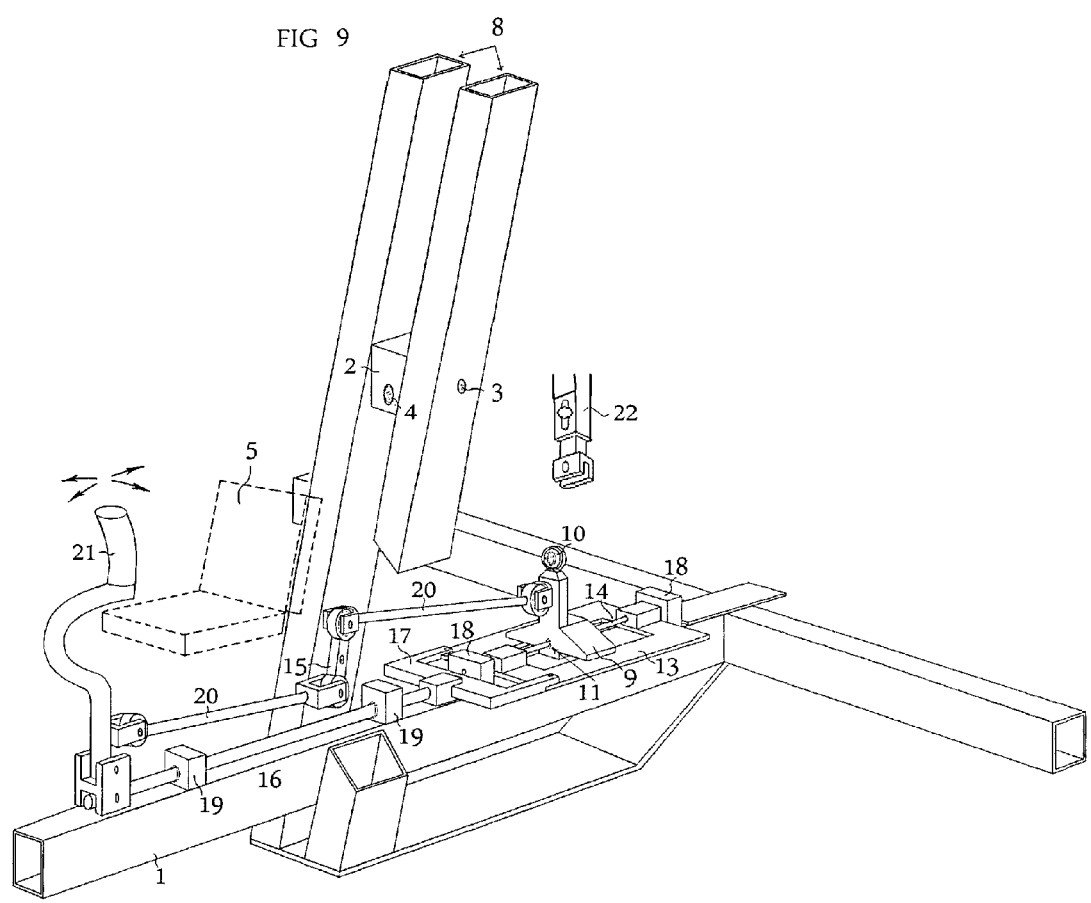

HUMAN INTERFACE ROTOR SYSTEM HELICOPTER (HIR)

BACKGROUND OF THE INVENTION

This invention relates to helicopters of a single mast, mechanical morphing-tilt airframe rotor design. There is a need for helicopters with rotor systems that allow such rotorcraft to be flown more easily and have fewer moving parts with longer operation hours. Such aircraft would be easier to operate, facilitating the instruction given to flight students and reduce maintenance costs. One concept that has not been fully addressed is the combination of human interface, i.e. the pilot moving with the machine for distributed weight assisted rotor control and mechanical manipulation or morphing to tilt the airframe. The object of the present invention is not to combine the aerodynamics of fixed and rotary winged aircraft as seen in other rotor concepts, but rather a combination of pilot interaction with the aircraft and mechanical manipulation of the airframe thereby changing the attitude of said airframe utilized in a single mast helicopter for a more efficient method of rotor disc control.

SUMMARY OF INVENTION

A principal object of this invention is to provide a single mast tilt airframe helicopter that utilizes two airframes joined by a gimbal block or multi-axis joint for tilting of a portion of the airframe that contains rotor system therein for directional flight control. A further object of this invention is to provide a helicopter that utilizes human interface by means of weight distribution manipulation to facilitate the tilting of said airframe with the rotor system for vectored thrust directional control. The tilt airframe rotor design of the present invention does not utilize the tilting of a pylon, split-mast rotor, or variable tilt mast as seen in previous designs, but rather a single mast tilt airframe-rotor in which the complete rotor system, drive train, power plant and a portion of the airframe, to include the tail boom and tail rotor, all tilt in unison with the operator changing the airframe attitude, thereby changing the plane of rotation for directional flight control. Redesigning the airframe so that there are two separate airframes joined with a gimbal joint or multi axis joint form a configuration in which the pilot's seat is primarily fixed to the lower airframe by the use of a spherical bearing. The forward lower portion of the seat, attaches to two extending struts by support control rods. These two struts attach to the foot pedal portion of the upper airframe. The lower airframe consists of a "T" shape horizontal frame and two vertical down tubes that cant rearward about 15 to 20 degrees that form a semi-tripod lower airframe by means of two laterally extending support braces. Located at the top of the down tubes is the required multi-axis joint or fastened mid-way up the vertical down tubes, just behind the pilot's seat, is a gimbal block or multi axis joint. Either joint, can be used to connect the upper airframe to the lower airframe. The upper airframe is comprised of the complete rotor system to include the reduction drive, power plant, tail boom and the above mentioned extending struts that extend down through and between the vertical down tubes and lateral support braces and continue under the pilot's seat, supporting the tail rotor pedals at the pilot's feet. The upper airframe can tilt forward, aft, and in a lateral attitude. The left strut fastens just below the power plant frame of the upper airframe to which the collective pitch stick is located, canting 40 to 45 degrees toward and across the left leg of the pilot. This prevents unwanted change of the collective pitch during forward and aft flight. The present invention is an improvement over helicopters of the prior art as it utilizes a more efficient method for rotor disc control, having a rotor system with fewer moving parts such as a thrust bearing plate assembly that replaces the existing complicated swash plate used for collective pitch.

BRIEF DESCRIPTION OF THE DRAWINGS

FIG. 7 depicts an enlarged view of the tilting mechanism/pylon inverted to show detail of the vibration resistant guide wheels and the lateral tilting plate with the stainless steel single slide/lateral tilting axis rod.

FIG. 7A depicts the tilting mechanism/pylon right side up

FIG. 8 is a perspective view of the tilting mechanism attached to the lateral tilting plate by means of the stainless steel tilting axis rod.

FIG. 9 is a detailed view of the lower airframe in the gimbal block configuration with one vertical down tube shown with a cut away section to illustrate detail of the flight control linkages attached to the tilting mechanism and lateral tilting plate.

DETAILED DESCRIPTION OF THE PREFERRED EMBODIMENT

Figure 1:
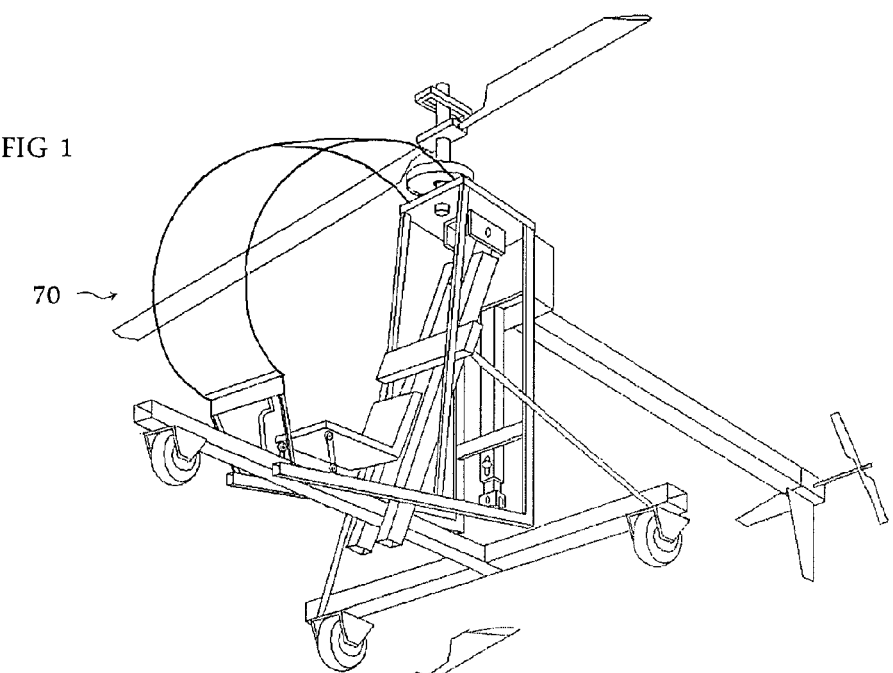
FIG. 1 is a perspective view of the testing prototype helicopter with no gimbal block or joint, only a single tilting axis for forward and aft test flight to prove the concept of human interface in single mast tilt rotors.
Figure 2:
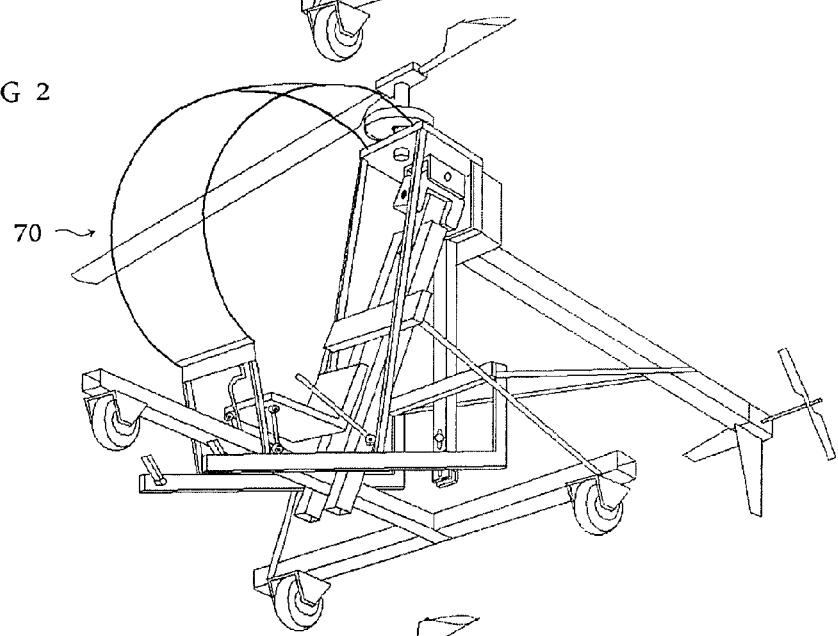
FIG. 2 is a perspective view of the gimbal joint configuration helicopter with the gimbal joint fastened atop the dual vertical down tubes.
Figure 3:
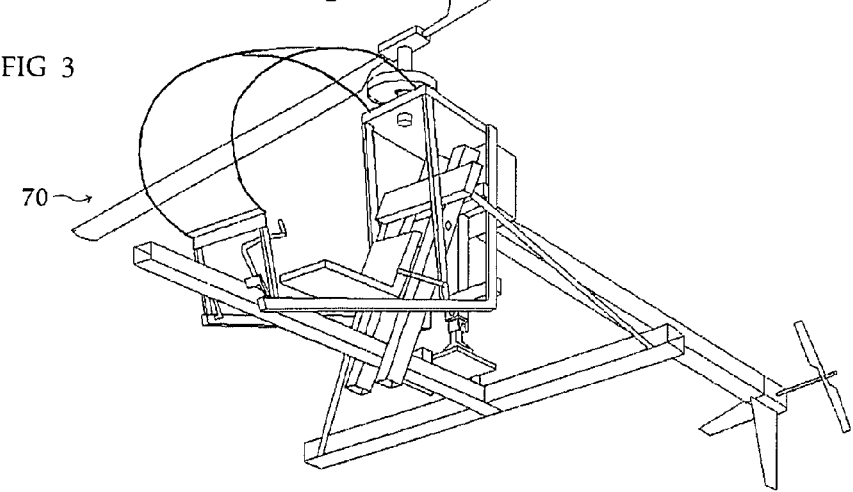
FIG. 3 is a perspective view of the gimbal block version helicopter with the gimbal block fastened in the center and between the vertical down tubes just behind the pilot's seat.
Figure 4:
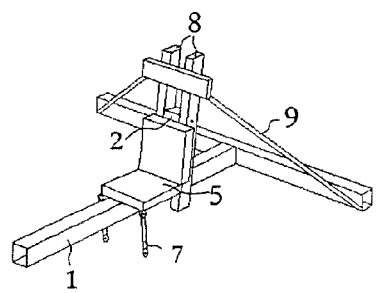
FIG. 4 depicts the lower airframe with the gimbal block configuration fastened in the center of the vertical tubes.
Figure 5:
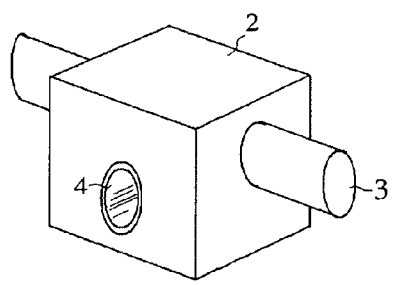
FIG. 5 shows an enlarged view of the gimbal bock with lateral axis pin receptacle and forward/aft axis pin.
Figure 6:
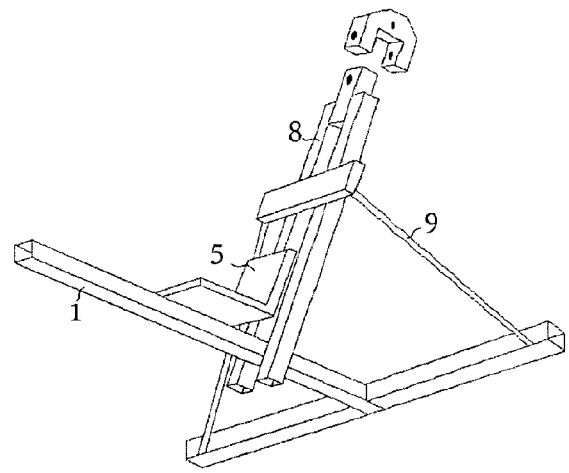
FIG. 6 is a perspective view of the lower airframe with a gimbal joint at the top of the vertical tubes rather than the gimbal block in the center of the vertical tubes as depicted in FIG. 4.
Figure 6A:
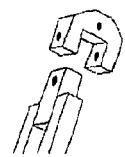
FIG. 6A is a perspective view of a gimbal joint rather than the gimbal block.
Figure 10:
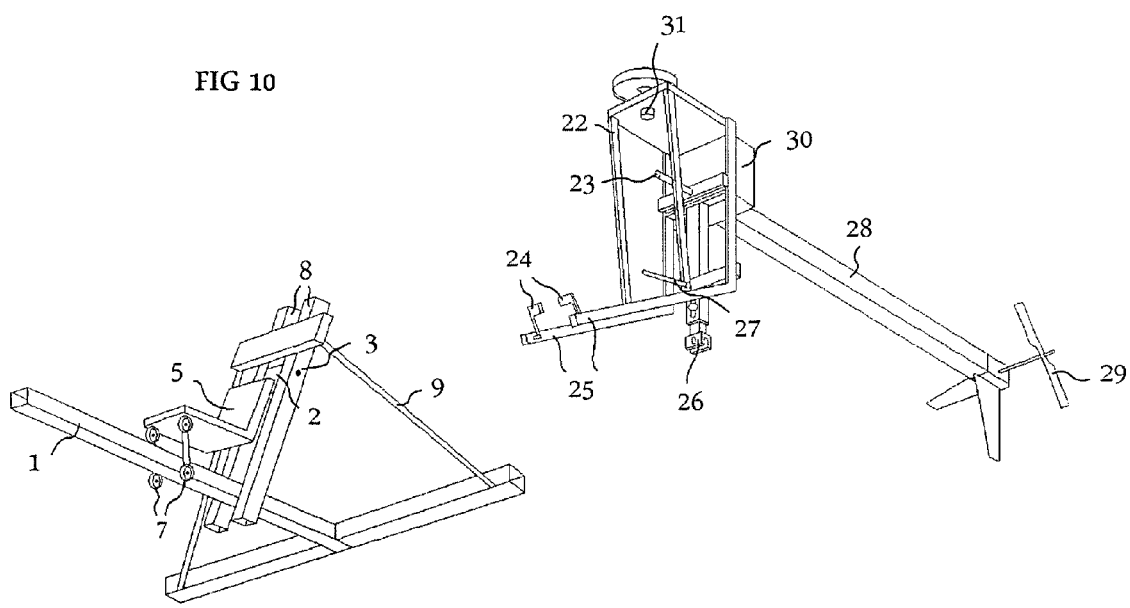
FIG. 10 is a perspective separated view of the lower and upper airframes for the gimbal block configuration and general view of a portion of the rotor system.
Figure 10A:
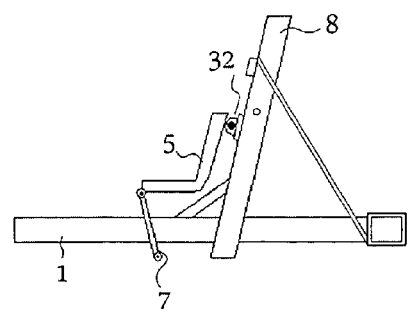
FIG. 10A is a side view of the lower airframe to show the placement of the spherical bearing of the pilot's seat.

Referring now to the drawings in FIGS. 1, 2 and 3 in more detail, the helicopter of this invention is generally designated by reference numeral 70. The helicopter of the present invention can be assembled into one of three different configurations. The first being a testing configuration, FIG. 1, having only a single tilting axis forward and aft with tail rotor yaw control. The second configuration, FIG. 2, has a gimbal joint at the top of the vertical down tubes from which the upper airframe is manipulated resulting in tilting of said upper airframe forward, aft and in lateral directions for directional flight control. The third configuration, FIG. 3, has a gimbal block fastened in the center and between the vertical down tubes. For the purpose of the detailed drawings of the present invention the depicted helicopter will be the third configuration, FIG. 3 with the gimbal block. As shown in FIG. 4, the lower airframe 1 is configured in a semi-tripod style with two vertical down tubes 8, lateral support braces 9, a pilot's seat 5 and a gimbal block 2. As shown in FIG. 5, the gimbal block 2 Has a two axis span of movement. A forward/aft axis pin 3 fastens the gimbal block to the lower airframe between the vertical down tubes midway up the said down tubes. The lateral axis pin receptacle 4 with bronze bearing attaches the upper airframe 22 to the gimbal block 2 by means of a lateral axis pin 23 shown clearly in FIG. 10. As clearly shown in FIGS. 6 and 6A the lower airframe 1 is an alternate airframe with a gimbal joint fixed at the top portion of the vertical down tubes 8. This type of helicopter is clearly illustrated in FIG. 2. As shown in FIGS. 7, 7A and 8, the rotor tilt mechanism 9 contains two vibration resistant wheels 12 that guide the tilting mechanism 9 as it traverses forward and rearward along an axis utilizing a bronze bearing 11 through which an axis of stainless steel 14 guides the tilting mechanism forward and rearward, tilting the upper airframe 22 in like manner for forward and aft flight. The tilting mechanism attaches to a lateral tilting plate 13. The stainless steel slide axis 14 also functions as a lateral tilting axis for the tilting mechanism 9 which slides by means of said bronze bearings 11. As shown in FIG. 9, the control stick 21 operated by a pilot, tilts the upper airframe 22 and rotor system through a system of bell cranks 15 and push/pull connecting rods 20 that slide the tilt mechanism 9 that is attached to the upper airframe by means of a spherical bearing 10 forward and aft and tilts the lateral tilting plate 13 laterally for directional flight control and thereby allowing the pilot seat 5 to tilt in like manner with the upper airframe 22 as it is mounted in line with the gimbal block 2. Moving the control stick 21 to the right will tilt the tilting plate yoke 17 and lateral tilting plate 13 to the right and thereby tilting the rotor system and upper airframe left, causing the helicopter to fly left in a lateral manner. The complete assembly consisting of the tilting mechanism 9 and the lateral tilting plate 13 attach to the lower airframe 1 by means of two bearing blocks 18 and facilitates tilting of the rotor assembly in lateral directions. A single place helicopter as seen in FIG. 10, comprising a fuselage that consists of a lower airframe 1 and an upper airframe 22; having a rotor shaft 31 attached thereto, rotor blades, and a hub on the shaft with means on said rotor shaft consisting of a thrust bearing assembly to change the blade pitch in a collective manner for vertical flight. The upper airframe 22 comprising the main rotor system, engine 30, drive train, tail boom 28 and tail rotor 29 tilt as one unit forward, rearward, left, and right for directional flight by means of a gimbal block 2 fastened to the lower airframe 1 between the two vertical down tubes 8 just behind the pilot's seat 5, connecting the upper and lower airframes. The vertical tubes 8 of the lower air frame 1 cant to the rear so as to allow a sliding tilt mechanism 9, as seen in FIG. 8, to traverse forward and rearward, thereby tilting the upper airframe 22 and rotor system from the lower portion of the upper airframe 26 which is a telescopic assembly that attaches to the spherical bearing of the tilting pylon 10. As depicted in FIG. 10, this rearward cant of the down tubes 8 also allows freedom of movement for said lower portion of the upper airframe 26 to move forward, rearward and in lateral directions above and within the lower airframe main center support beam, vertical down tubes 8 and lateral support braces 9 without pushing the center of gravity outside the safe operating range of the aircraft. As shown in FIGS. 10 and 10A, a pilot's seat 5 is attached to both the vertical down tubes 8 of the lower airframe 1 at the upper portion of the seat by means of a spherical bearing 32, more clearly seen in FIG. 10A, and to the upper airframe 22 at the lower end of the seat 5 by means of two control rods 7 that attach to two struts 25 fastened in a rigid manner to the upper airframe 22 that extend down through from the upper airframe 22 to the lower airframe 1, stopping just under and slightly forward of the pilot's seat 5. At the end of said struts 25 is located the tail rotor control pedals 24. This configuration distributes the weight of the pilot between both the upper and lower airframes as the pilot's seat 5 is attached to both and moves with the upper airframe 22 thereby changing the thrust vector of the rotor blades of the helicopter for directional flight control. Allowing the pilot seat to move with the upper airframe at equal moments causes a change in the weight distribution of the pilot's body weight and manipulates the upper airframe independently of the lower airframe while remaining attached to said lower airframe and thereby tilting the upper airframe and rotor disc for directional control of the rotorcraft. The helicopter of the present invention would be easier to operate compared to helicopters of the prior art as the swash plate has been eliminated, negating the angular differences between advancing and retreating blades culminating to configure a rotorcraft design with extended part operation hours, reducing maintenance costs.

REFERENCES CITED

U.S. Pat. No. 2,352,342 PITCAIRN
U.S. Pat. No. 3,118,504 CRESAP (BELL AEROSPACE ASSIGNOR)
U.S. Pat. No. 3,391,746 CARDOSO
U.S. Pat. No. 3,586,263 PAYNE
U.S. Pat. No. 3,765,622 HAINES
U.S. Pat. No. 3,921,939 GARFINKLE
U.S. Pat. No. 4,071,206 MAGILL
U.S. Pat. No. 4,473,199 MAGILL
U.S. Pat. No. 5,370,341 LEON
U.S. Pat. No. 5,740,987 MORRIS et al.
U.S. Pat. No. 6,293,492 B2 YANAGISAWA
U.S. Pat. No. 7,128,293 B2 ISLEY
U.S. Pat. No. 7,168,656 B2 PAI
U.S. Pat. No. 7,198,223 B2 PHELPS III.

What is claimed is as follows:

1. A single mast rotary aircraft comprising:
   an upper airframe comprising
      a rotor with a plurality of blades;
      a powerplant;
      a tail boom with a tail rotor and;
   a semi-tripod lower airframe;
   a set of landing gear and;
   a pilot's seat;
   wherein an upper portion of the pilot's seat is attached to the lower airframe via a spherical bearing and a lower portion of the pilot's seat is pivotably attached to the upper airframe;
   wherein the upper airframe is attached to the lower airframe by control means and an offset axis joint or a gimbal and;
   wherein the upper airframe tilts forward, aft and laterally independently of the lower airframe with the pilot's weight equally distributed between the upper and lower airframes and the rotor disc is controlled by changing the attitude of the upper airframe.

* * * * *